Dec. 5, 1967  H. M. PIKER  3,356,243
INSULATED CONTAINER OR BOTTLE
Filed Nov. 7, 1963  2 Sheets-Sheet 1

INVENTOR.
HERBERT M. PIKER
BY
Joseph A. Pave
Attorney

Dec. 5, 1967  H. M. PIKER  3,356,243
INSULATED CONTAINER OR BOTTLE
Filed Nov. 7, 1963  2 Sheets-Sheet 2

INVENTOR.
HERBERT M. PIKER
BY
Joseph A. Pavé
Attorney

United States Patent Office 3,356,243
Patented Dec. 5, 1967

3,356,243
INSULATED CONTAINER OR BOTTLE
Herbert M. Piker, Wyoming, Ohio, assignor to The Hamilton-Skotch Corporation, Hamilton, Ohio, a corporation of Ohio
Filed Nov. 7, 1963, Ser. No. 322,128
7 Claims. (Cl. 215—13)

This invention relates to improvements in an insulated container, more particularly to an insulated bottle or carafe.

Insulated containers or bottles are basically well-known, their construction and delineations having taken many forms in the past but with more or less success and failure due to their constructions. In the past difficulty has been experienced in the formation of the parts whereby there may be readily and economically produced and assembled to avoid undesirable results in the use thereof.

In the past, difficulty has been experienced in providing a structure which had truly insulated properties and could be produced economically. Another difficulty in the past has been the provision of an insulated bottle in which a screw cap was employed and in which the inner container was not retained against rotation during the application and removal of the cap thereon.

It is, therefore, the principal object of the present invention to provide an insulated container, particularly an insulated bottle, wherein the inner container is completely and fully insulated from the atmosphere.

Another object of this invention is the provision of an insulated container, particularly a bottle, in which use is made of an inner container or bottle, per se, with an outer member and in which relative rotation of the parts after assembly is prohibited.

A further object of the present invention is the provision of an insulated container or bottle which accomplishes the foregoing objects and in which a screw cap and closure member is employed without danger of a relative rotation of the parts.

A further and specific object of the present invention is the provision of an insulated container in the form of a bottle or carafe that accomplishes the foregoing objects and is economically produced so that the same may be economically acquired.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings.

Throughout the several views of the drawings similar reference characters are employed to denote the same or similar parts.

Figure 3:
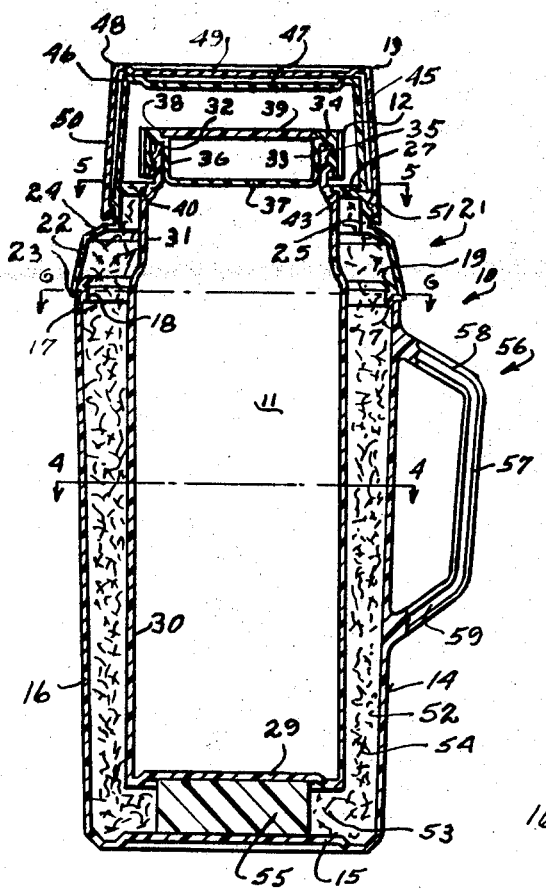
FIG. 3 is a vertical, elevational view of the device of the present invention as seen from line 3—3 on FIG. 2.

As noted above this invention relates, broadly, to an insulated container, but more specifically to an insulated bottle, and wherein use is made of an outer enclosing device and an inner container member with insulation between said outer member and inner container. In the present structure emphasis is placed on the construction and assembly of the outer member and the inner container or bottle whereby the parts are connected with one another against inadvertent separation and relative angular movement or rotation.

Specifically, the outer member, indicated in its entirety by the reference numeral 10, encloses an inner member or bottle indicated in its entirety by the reference numeral 11, with said inner member or bottle 11 closed by a plug-cap indicated in its entirety by the reference numeral 12 while the outer member 10 has removably connected therewith a closure member, which also serves as a cup, 13.

Specifically the outer member 10 comprises, preferably, but not necessarily, a lower portion 14 for the major portion of the height of the device with said lower portion including a bottom 15 from the periphery of which upstands a wall 16. The wall 16, slightly, upwardly, outwardly flares and terminates at its upper end in a circumferential groove 17 formed into, in effect, an inwardly projecting collar 18 integral with the wall 16. The collar 18 has upwardly thereof an inwardly tapered flange 19 with the diameter of its upper or free edge somewhat less than the diameter of its lower edge where it is attached to the outer member lower portion wall 16.

Figure 9:
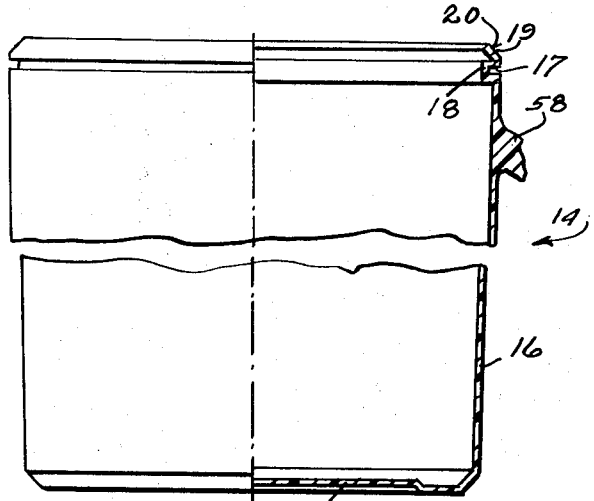
FIG. 9 is a fragmentary view, partly in section and partly in elevation of the second or lower part of the outer or enclosing member.

As will be seen from the drawings and particularly from FIG. 9 the flange 19 is, in effect, a truncated conical sleeve upwardly of the collar groove 17. As a matter of fact the said conical sleeve, or flange, 19 utilizes its outer surface 20 as a cam for connecting the outer member upper part, indicated in its entirety by the reference numeral 21, to the said lower part 14 in completing the outer container.

The upper part of the outer container 10, as noted above, is indicated in its entirety by the reference numeral 21 and includes, primarily for artistic effect, a circular sleeve or wall portion 22, in the form and to give the effect of a truncated cone, and which terminates at its lower end with an inwardly projecting substantially horizontal flange 23. The wall 22 at its upper end sharply inwardly extends at 24 terminating at its inner end with the lower end of an upstanding sleeve 25. The sleeve 25 is provided on its exterior surface with threads 26 utilized for securing thereto a closure cap, as will presently be made clear. The upper end of the sleeve 25 terminates in an inwardly extending horizontal or radial flange 27 relatively thick by comparison with the thickness of the walls of the balance of the parts making up the outer member top portion 21 for a purpose presently to be made clear. The flange 27 is provided centrally thereof with an opening 28 through which the inner member or bottle neck projects as will subsequently be made clear.

The bottle 11 is to all intents and purposes just that and is substantially circular in cross-section and of a uniform diameter for the major part of its length. The bottle 11 includes a bottom 29 from the periphery of which upstands the wall 30 which near its upper end is slightly reduced in diameter as at 31 followed by a further reduced diameter or neck portion 32. The neck portion 32 provides the entrance to the bottle 11 and through which the contents of the bottle are introduced and withdrawn.

The bottle neck 32 is provided on its external surface with protuberances or threads 33 and through which the bottle closure cap 12 is attached and secured.

The cap 12 not only closes the filling and discharge neck 32 but also acts as a cork, an insulated sealer for the bottle 11. For this purpose the cap 12 has a ringlike body portion 34 from the outer periphery of which depends a skirt 35 having inwardly extending protuberances or threads to engage with the bottle neck threads 33 and from the inner periphery of the ringlike body portion 35 depends a hollow plug, including a circular sleeve-like wall 36 and a closing bottom 37 at the lower or inner end of the sleeve 36. Circumferentially of the sleeve 36 the ringlike body portion 35 is undercut as at 38 providing a groove and a seat receiving and securing in position a sealing disc 39.

As seen in FIG. 3 the closure cap 12 is provided between the inner surface of its skirt 35 and the outer surface of its plug seal sleeve 36 with a space receiving the filling neck 32 and with the opposed surfaces of sleeve 36 and neck 32 being provided with the male and female threads through which the closure cap and sealing plug 12 is attached to the filling neck of the bottle. The space within the closure plug sleeve 36 and between the bottom 37 thereof and the disc 39 may be filled with insulating material, as will presently be defined, or may remain as a dead air space and thereby providing a seal or insulating barrier between the interior of the bottle 11 and the atmosphere above the bottle.

Any suitable or desirable means may be employed for securing the disc 39 in position, that shown in the drawings consisting in forming the groove 38 with an outwardly, downwardly extending wall beneath which the disc is inserted by temporarily deforming the said disc while being inserted in the groove and allowing the same to spring to its normal form and thereby be operatively connected against inadvertent disassociation.

Figure 7:
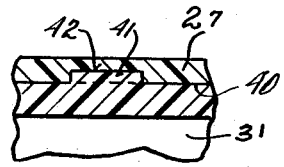
FIG. 7 is a fragmentary, sectional view through the lock or key between the inner container and outer member as seen from line 7—7 on FIG. 5.

The inner container or bottle 11 is provided at the upper end of its reduced portion 31 with a further slightly reduced portion forming a shoulder including a flat seat 40, with the diameter of said slightly reduced portion substantially equal to the diameter of the aperture or opening 28 in the outer part upper portion flange 27 whereby a relatively close fit is effected for the projection of the reduced diameter portion and opening. At substantially diametrically opposite points the said shoulder flat seat 40 has upstanding therefrom lugs 41 with said lugs having a height substantially equal to one-half of the thickness of the outer member flange 27. At corresponding points the said outer member flange 27 is provided with upwardly extending pockets or seats 42, see particularly FIG. 7, and into which pockets the lugs 41 project. As will be subsequently made clear the lugs 41 and pockets or seats 42 upon inter-engagement with one another effect a lock between the said inner container 11 and assembled outer member 14.

The outer member upper portion 21 is further provided at its upper end with a reduced diameter portion 43 thereby providing a seat or shoulder 44 just downwardly of the upper end of the said outer member upper portion. Disposed on the said seat 44 and around the reduced portion 43 is the rim of the wall 45 of a first cup 46 which has, as seen in FIG. 3, at the upper end of the wall 45 a bottom 47. The diameter of the cup rim may be such that a slight friction fit is effected between the said rim of the wall and the reduced portion 43 for frictionally retaining the said cup in operative position.

A second cup, indicated in its entirety by the reference numeral 48, is provided and which second cup is the closure member for the entire structure with said second cup including a bottom 49 from which outwardly, downwardly as seen in FIG. 3, extends its wall 50. The free end of the wall 50 is provided with inwardly extending projections 51 that act as threads to co-operate with the projections or threads 26 on the outer member upper part sleeve 25.

The outer or second cup is formed to a dimension that when screwed home the inner surface of its bottom 49 engages with the outer surface of bottom 47 of the inner cup for thereby additionally retaining the inner cup in operative position.

As will be seen in FIG. 3 by the construction just described an air space is provided between the upper end of the inner container, its closure cap and plug, and the atmosphere exteriorly of said outer or second cup 48 for thereby reducing transfer of heat through the upper end of the inner container.

As will be noted from FIG. 3 the outer member upper and lower portions are formed to dimensions whereby the inner surface of their walls are spaced from the outer surface of the inner member or container walls and which space 52 is filled with heat resistant transfer material or insulation. It will further be noted that the height of said inner container is of a lesser dimension than the outer member wherefore a space 53 is provided between the bottom 29 of the inner container and the bottom 15 of the outer member.

After the parts, that is, the inner member or container 11 has been formed and the outer member upper and lower portions 14 and 21 have been formed, the inner member or container has its filling neck 32 and upper reduced sleeve portion 31 inserted through the outer member upper portion flange opening 28. This assembly of the parts is carefully effected since it is necessary to interfit, at this time, the tongues or lugs 41, upstanding from the shoulder seat 40 with the recesses or pockets 42 in the flange 27. With the parts so assembled the outer member lower portion 14 is now connected with the said upper portion 21.

Prior to the said connection of the upper and lower portions of the outer member insulation, in the form of the well-known plastic foam, 54 is introduced to fill the space 52 between the inner member or container and outer member. This insulation 54 may take the form of the usual blanket type of insulation but preferably is formed by the introduction into said space of the chemicals which normally react to provide said insulation.

This foam type of plastic insulation is well-known and consists, essentially, of mixing two liquids such as, toluene and di-isocyanate. In other words, after the inner container and outer member upper part have been interconnected and before the outer member lower part 14 is connected wih the outer member upper part, proper quantities of the liquids, such as, toluene and di-isocyanate, are placed within the said space 52 between the inner container and outer member upper part and thereafter the said outer member lower part is connected with its upper part.

The chemical reaction of the insulation, or foam, forming liquids commences substantially immediately upon their association and continues until the said chemical reaction has affected all of the liquids and which means that the entire space is taken up by the said foam. The foam hardens to a substance generally referred to as foam plastic having a definite shape and rigidity. This action therefore results in the space between the assembled outer member inner surface and the outer surface of the inner container or bottle and between the upper surface of the outer member bottom 15 and under surface of said outer member flange 27.

Prior to the connection of the outer member upper and lower portions a preformed block 55 of foam insulation is positioned to be between the inner container bottom 29 and outer member bottom 15. The thickness or height of this block 55 is such that the inner container is upwardly held to maintain its lugs 41 locked in the pockets or recesses 41.

It is to be understood that the upper and lower portions of the outer member are now interconnected with one another and said interconnection having been effected by inserting the upper or free end of inclined flange 19 into the opening centrally of the horizontal flange 23 and axially moving said parts until the said horizontal flange 23 snaps into groove 17 thereby locking the parts to one another as illustrated in FIG. 3.

At this time the chemical reaction of the materials producing the foam insulation is taking place for filling the space 52 between the inner container and outer member and at the same time filling the space 53 between the bottoms and outwardly of the insulation block 55 and thereby further locking the parts to one another. This further locking of the parts preventing any attempted inward squeezing of the upper end of the outer member lower portion 14 and thereby attempting to release the horizontal flange 23 from the groove 17.

The foregoing provides an insulated container or bottle which may be used or employed as any of the well-known vacuum or insulated bottles.

Figure 1:
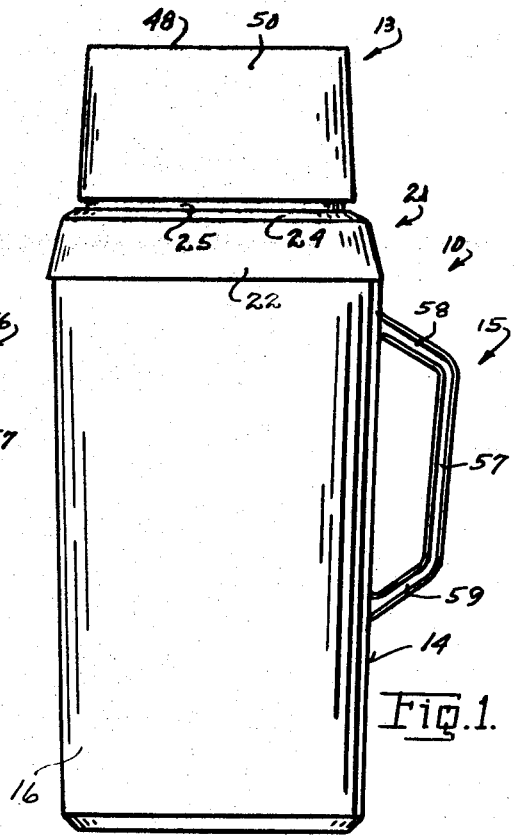
FIG. 1 is an elevational view of the insulated container, bottle, carafe, embodying the principles and structure of the present application.
Figure 4:
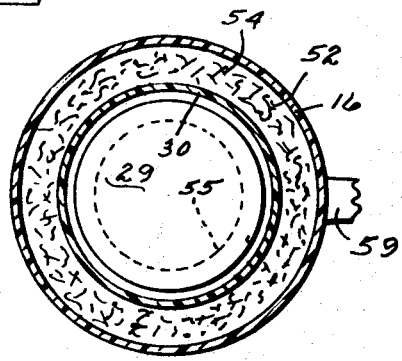
FIG. 4 is a transverse, sectional view through the container of the present invention as seen from line 4—4 on FIG. 3.
Figure 2:
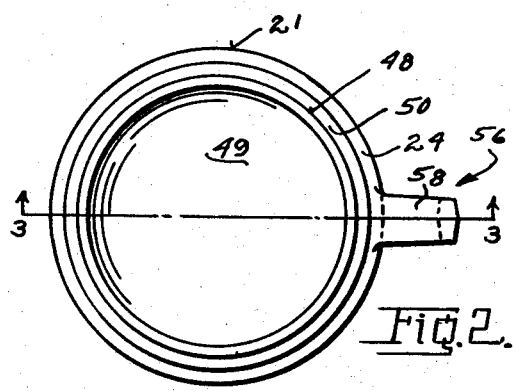
FIG. 2 is a top plan view of the device as seen in FIG. 1.
Figure 5:
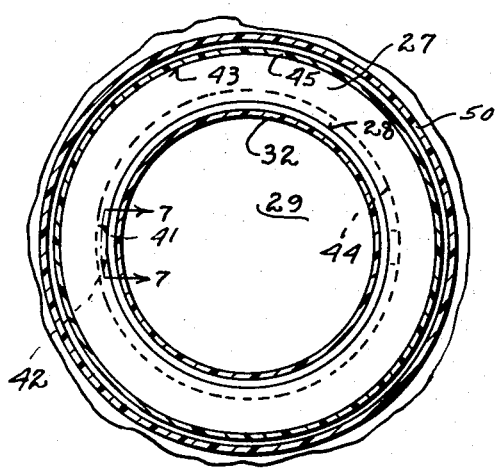
FIG. 5 is an enlarged, horizontal, sectional view through the upper portion of the container with parts thereof being in section and parts in elevation as seen from line 5—5 on FIG. 3.
Figure 6:
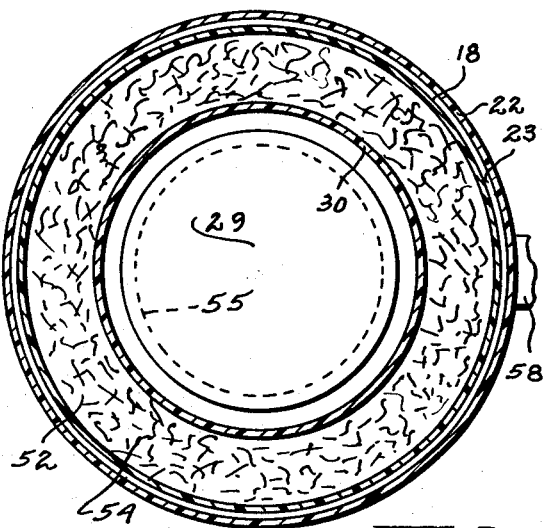
FIG. 6 is an enlarged, transverse, sectional view through the container of the present invention as seen from line 6—6 on FIG. 3.
Figure 8:
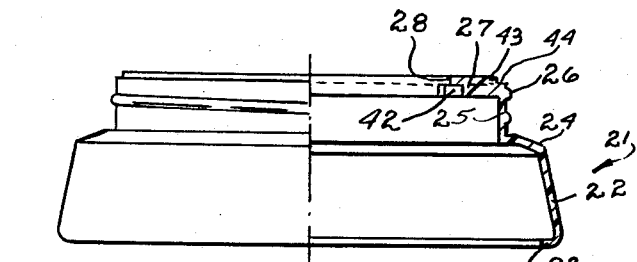
FIG. 8 is a view partly in section and partly in elevation of the upper portion of the outer member of the insulated container of the present invention.

The above bottle may be converted to a "carafe" by having attached to the outer surface of the outer member a suitable handle. As shown in FIGS. 1 and 2 the outer member lower portion 14 has integral therewith a handle 56 consisting of a body portion 57 from the opposite ends of which outwardly incline upper connecting part 58 and lower connecting part 59.

From the foregoing it will now be appreciaed there has been provided an insulated container that accomplishes the objects initially set forth.

What is claimed is:

1. In an insulated container or bottle the combination of an inner container including a filling neck, a shoulder radially, outwardly, extending from the neck at its lower end with said shoulder having a given area with a plane top surface, an outer enclosing member for said inner container, said outer enclosing member including an upper end having an aperture centrally thereof through which the inner container filling neck projects, said outer enclosing member upper end radially outwardly of its central aperture including a flange having its bottom surface plane and of an area at least equal to the plane top surface of the inner container shoulder, said inner container shoulder top plane surface and outer member flange bottom plane surface contacting one another for positioning the inner container centrally of the outer member, means between said inner container and outer enclosing member holding said inner container shoulder top plane surface and enclosing member flange bottom plane surface in face contact with one another, and cooperating means in said inner container shoulder plane surface and outer member radial flange plane surface locking the said inner container and outer enclosing member against relative rotative movement with respect to one another.

2. In an insulated container or bottle the combination as set forth in claim 1 characterized by, said means holding said inner container shoulder top plane surface and enclosing member flange bottom plane surface in face contact with one another including said inner container and said outer container each having a bottom spaced from one another, and a relatively non-compressible block between said bottoms for maintaining same in spaced relation and the said inner container shoulder plane top surface and said enclosing member flange plane bottom surface in surface contact with one another.

3. In an insulated container or bottle the combination as set forth in claim 1 characterized by, said cooperating means for locking the inner container and enclosing member against relative rotative movement including one of said inner container shoulder top plane surface and enclosing member radial flange bottom plane surface having projecting therefrom a lug while the other of said surfaces having formed therein a recess receiving said lug.

4. In an insulated container or bottle the combination as set forth in claim 1 characterized by, said cooperating means for locking the inner container and enclosing member against relative rotative movement including said inner container shoulder plane top surface having upwardly extending therefrom a lug, and said enclosing member horizontal flange bottom plane surface having upwardly extending therefrom a recess receiving said lug for maintaining said inner container and enclosing member against relative rotative movement.

5. In an insulated container or bottle the combination as set forth in claim 1 characterized by, said means holding said inner container shoulder top plane surface and enclosing member flange bottom plane surface in face contact with one another including said inner container and said outer container each having a bottom spaced from one another, and a relatively non-compressible block between said bottoms for maintaining same in spaced relation and the said inner container shoulder plane top surface and said enclosing member flange plane bottom surface in surface contact with one another, and said cooperating means for locking the inner container and enclosing member against relative rotative movement including one of said inner container shoulder top plane surface and enclosing member radial flange bottom plane surface having projecting therefrom a lug while the other of said surfaces having formed therein a recess receiving said lug.

6. In an insulated container or bottle the combination as set forth in claim 1 characterized by, wherein said outer enclosing member is formed of an upper portion and a lower portion having their respective lower edge and upper edge adjacent one another and inter-locked to enclose the inner container, said outer enclosing member lower portion including the bottom of the outer member enclosing assembled portions, and said inner container including a bottom upwardly spaced from said outer enclosing member bottom and between which bottoms is disposed the means for maintaining said outer enclosing member flange top plane surface in contact with the inner member shoulder plane bottom surface.

7. In an insulated container or bottle the combination as set forth in claim 1 characterized by, wherein said outer enclosing member is formed of an upper portion and a lower portion having their respective lower edge and upper edge adjacent one another and inter-locked to enclose the inner container, said outer enclosing member lower portion including the bottom of the outer member enclosing assembled portions, and said inner container including a bottom upwardly spaced from said outer enclosing member bottom, and a relatively non-compressible block in the spaced between the inner container and enclosing member bottoms for maintaining same in spaced relation and maintaining the inner container shoulder plane top surface in contact with the enclosing member radial flange plane bottom surface.

References Cited

UNITED STATES PATENTS

| | | | |
|---|---|---|---|
| 1,639,529 | 8/1927 | Payson et al. | 215—12 |
| 2,859,085 | 11/1958 | Morrison | 215—12 |
| 2,994,448 | 8/1961 | Sepe et al. | 215—12 |
| 3,028,984 | 4/1962 | Bramming | 215—13 |
| 3,067,896 | 12/1962 | Berg et al. | 220—4 |
| 3,132,759 | 5/1964 | Piker | 215—13 |
| 3,298,554 | 1/1967 | Piker | 215—13 |

JOSEPH R. LECLAIR, *Primary Examiner.*

FRANKLIN T. GARRETT, *Examiner.*

R. PESHOCK, *Assistant Examiner.*